(12) United States Patent
Ricouard et al.

(10) Patent No.: US 11,261,074 B2
(45) Date of Patent: Mar. 1, 2022

(54) APPARATUS FOR DISPENSING A MIXTURE OF AT LEAST TWO LIQUID COMPONENTS

(71) Applicants: Alvin B. Ricouard, New Orleans, LA (US); Troy A. Organo, Metairie, LA (US); At Group, LLC, Jefferson, LA (US)

(72) Inventors: Alvin B. Ricouard, New Orleans, LA (US); Troy A. Organo, Metairie, LA (US)

(73) Assignee: At Group, LLC, Jefferson, LA (US)

( * ) Notice: Subject to any disclaimer, the term of this patent is extended or adjusted under 35 U.S.C. 154(b) by 0 days.

(21) Appl. No.: 16/958,920

(22) PCT Filed: Dec. 28, 2018

(86) PCT No.: PCT/US2018/067897
§ 371 (c)(1),
(2) Date: Jun. 29, 2020

(87) PCT Pub. No.: WO2019/133833
PCT Pub. Date: Jul. 4, 2019

(65) Prior Publication Data
US 2020/0339403 A1    Oct. 29, 2020

Related U.S. Application Data

(60) Provisional application No. 62/612,142, filed on Dec. 29, 2017.

(51) Int. Cl.
*B67D 1/00* (2006.01)
*B67D 1/08* (2006.01)
*B67D 1/10* (2006.01)

(52) U.S. Cl.
CPC ......... *B67D 1/0016* (2013.01); *B67D 1/0857* (2013.01); *B67D 1/0895* (2013.01); *B67D 1/10* (2013.01)

(58) Field of Classification Search
CPC .. B67D 1/0016; B67D 1/0857; B67D 1/0895; B67D 1/10; F04B 2205/11; F04B 23/06;
(Continued)

(56) References Cited

U.S. PATENT DOCUMENTS 3,754,735 A  *  8/1973  Hoyle .................. B01F 15/042
                                                          366/132
3,920,223 A  * 11/1975  Krueger ............. B01F 7/00408
                                                         366/156.2

(Continued)

FOREIGN PATENT DOCUMENTS

GB          978807 A   * 12/1964
JP         S59 95957 A    6/1984
(Continued)

*Primary Examiner* — Lien M Ngo
(74) *Attorney, Agent, or Firm* — Edwin A. Sisson, Attorney at Law, LLC; Jeffrey J. Banyas (57) ABSTRACT

Disclosed herein is an apparatus for dispensing a mixture of at least two liquid components. The apparatus may comprise an A liquid component source fluidly connected with an A liquid component pump driven by a first motor; and a B liquid component source fluidly connected with a B liquid component pump driven by the first motor. Each of the A liquid component pump and the B liquid component pump may comprise at least two chambers. The A liquid component pump and the B liquid component pump may be fluidly connected with a dispenser unit. There may be one or more A liquid temperature regulators between the A liquid component pump and the dispenser unit. Similarly, there may be one or more B liquid temperature regulators between the B liquid component pump and the dispenser unit.

19 Claims, 9 Drawing Sheets

(58) Field of Classification Search
CPC .......... F04B 23/02; F04B 23/04; F04B 17/03;
F04B 13/02; B29B 7/726; B29B 7/7585;
B29B 7/749; B29B 7/823; B05B 12/1445;
B05B 12/1472; B05B 7/16; B05B 7/0018;
B05B 7/2486; B05B 9/0409
USPC ........ 222/145.6, 145.5–145.8; 239/130–137;
259/8
See application file for complete search history.

(56) References Cited

U.S. PATENT DOCUMENTS

| | | | |
|---|---|---|---|
| 5,005,765 A | | 4/1991 | Kistner |
| 5,080,164 A | * | 1/1992 | Hermans ................. A23L 3/185 |
| | | | 165/66 |
| 9,056,327 B2 | * | 6/2015 | Courier ................ G05D 11/132 |
| 10,159,996 B2 | * | 12/2018 | McAndrew ............. B05B 9/002 |

FOREIGN PATENT DOCUMENTS

| | | |
|---|---|---|
| WO | 2014/099796 A1 | 6/2014 |
| WO | 2017/053294 A1 | 3/2017 |

\* cited by examiner

APPARATUS FOR DISPENSING A MIXTURE OF AT LEAST TWO LIQUID COMPONENTS

CROSS REFERENCES AND PRIORITIES

This Application claims priority from International Application No. PCT/US2018/067897 filed on 28 Dec. 2018 and United States Provisional Application No. 62/612,142 filed on 29 Dec. 2017, the teachings of each which are incorporated by reference herein in their entirety.

BACKGROUND

When dispensing a mixture of two liquid components, it is often necessary to keep the two components separate until they are dispensed onto or into their application site. This is particularly the case for reactive components such as those used to make foamed components, but is also true for certain non-reactive components.

One particular application which requires two liquid components to be kept separate until reaching their application site is spray polyurethane foams. Polyurethane foams are used for a variety of applications including upholstery, footwear, electronics, and injection molded components. Polyurethane foams can also be applied to various areas of a building as a sealant or insulation. Such polyurethane foams are typically known as spray foam or spray polyurethane foam (SPF) and generally fall into two categories. The first category are medium-density closed-cell spray foams (ccSPF), which are more rigid and often serves as a vapor and/or air barrier in homes and other buildings. The second category are light-density open-cell spray foams (ocSPF), which are semi-rigid and sponge-like in appearance, and often serve to fill cracks and crevices in homes and other buildings.

SPF is typically made up of two reactive components, an isocyanate component and a polyol. The two components react when mixed. This reaction causes the components to expand well beyond their liquid volume when sprayed into place.

The prior art process for applying SPF involves a pumping apparatus in which an isocyanate source is connected to a first pump and a polyol source is connected to a second pump. In the prior art processes, the first pump and the second pump are non-linear piston pumps or gear pumps which are driven either by air, electricity, or hydraulic drives. The two pumps are used to pass the polyol and the isocyanate to a dispenser unit. The isocyanate and the polyol are typically mixed at the end of the dispenser unit, also known as the tip or the impingement port, just before the components are discharged onto or into a surface.

One example of a method and apparatus for applying SPF can be found in U.S. Pat. No. 5,005,765 (the "765 Patent"). The '765 Patent discloses a system for metering dual component materials that comprises a first gear pump and a second gear pump with a drive source for simultaneously driving the first gear pump and the second gear pump, and an applicator for receiving the two components from the gear pumps and applying them to a surface or to fill a void.

Another example of a system for applying SPF can be found in U.S. Pat. No. 9,056,327 (the "'327 Patent"). The '327 Patent discloses a modular plural component spray system for spraying polyurethane spray foam comprising a series of two independently driven hydraulic reciprocating piston pumps capable of delivering any two-component fluid materials that can be mixed by static or impingement mixing.

Existing systems and methods for applying SPF suffer from many known problems. One problem with existing systems and methods is time delays, also known as lag, in the pumping system. These time delays can cause inconsistent mixing ratios for the SPF components, inconsistent temperature fluctuations for the SPF components being mixed, and in extreme cases, can cause the pumping system to clog resulting in time consuming and expensive cleaning and repair.

The need exists, therefore, for an improved system and method for dispensing a mixture of two liquid components which provides for more consistent mixing ratios and improved temperature control of the components.

SUMMARY

Disclosed herein is an apparatus for dispensing a mixture of at least two liquid components said apparatus comprising: an A liquid component source which is fluidly connected with an A liquid component pump driven by a first motor, said A liquid component pump having an A liquid component pump inlet and an A liquid component pump outlet which is fluidly connected with; a dispenser unit; a B liquid component source which is fluidly connected with a B liquid component pump driven by the first motor, said B liquid component pump having a B liquid component pump inlet and a B liquid component pump outlet which is fluidly connected to the dispenser unit. In some embodiments, the A liquid component pump comprises at least two chambers, the B liquid component pump comprises at least two chambers, there is a first A liquid temperature regulator located between the A liquid component pump and the dispenser unit, a second A liquid temperature regulator located between the first A liquid component temperature regulator and the dispenser unit, a first B liquid temperature regulator located between the B liquid component pump and the dispenser unit, and a second B liquid temperature regulator located between the first B liquid component temperature regulator and the dispenser unit.

The apparatus may further comprise a third A liquid component temperature regulator located between the A liquid component source and the A liquid component pump, and a third B liquid component temperature regulator located between the B liquid component source and the B liquid component pump. The third A liquid temperature regulator and the third B liquid temperature regulator may each independently selected from the group consisting of a direct temperature regulator and an indirect temperature regulator. The third A liquid temperature regulator and the third B liquid temperature regulator may each be independent indirect temperature regulators.

The apparatus may further comprise a first solids source. The first solids source may be added directly to the A liquid component source. The first solids source may be injected into one or both of the first A liquid temperature regulator and the fluid connection between the A liquid component source and the A liquid component pump.

The apparatus may further comprise a first mixer unit. The first mixer unit may be connected to or inside of the fluid connection between the A liquid component pump and the dispenser unit.

The apparatus may further comprise a second solids source. The second solids source may be added directly to the B liquid component source. The second solids source may be injected into one or both of the first B liquid temperature regulator and the fluid connection between the B liquid component source and the B liquid component pump.

The apparatus may further comprise a second mixer unit. The second mixer unit may be connected to or inside of the fluid connection between the B liquid component pump and the dispenser unit.

The first A liquid temperature regulator, the second A liquid temperature regulator, the first B liquid temperature regulator, and the second B liquid temperature regulator may each independently be selected from the group consisting of a direct temperature regulator and an indirect temperature regulator.

The A liquid component pump may have a linear flow. The B liquid component pump may have a linear flow. The A liquid component pump and the B liquid component pump may each independently be selected from the group consisting of diaphragm pumps, piston pumps, and positive displacement gear pumps.

The first motor may be selected from the group consisting of hydraulic motors, air-driven motors, and electrically-driven motors. The first motor may comprise a drive mechanism comprising a first drive shaft for driving the A liquid component pump, and a second drive shaft for driving the B liquid component pump. The first motor may drive the A liquid component pump in a first direction, and may drive the B liquid component pump in a second direction which is the same direction as the first direction. The first motor may drive the A liquid component pump at a first speed, and may drive the B liquid component pump at a second speed which is the same speed as the first speed.

In some embodiments, the A liquid component pump may be driven by an A liquid component motor and the B liquid component pump may be driven by a B liquid component motor.

The fluid connection between the A liquid component pump and the dispenser unit, and the fluid connection between the B liquid component pump and the dispenser unit may each be selected so as to have a pressure drop represented in terms of a decrease of psig per an amount of linear feet wherein the decrease of psig may be selected from the group consisting of between 1 psig and 200 psig, between 1 psig and 150 psig, between 1 psig and 100 psig, between 1 psig and 50 psig, and between 1 psig and 25 psig; and the amount of linear feet is selected from the group consisting of between 25 linear feet and 800 linear feet, between 25 linear feet and 600 linear feet, between 25 linear feet and 500 linear feet, between 25 linear feet and 400 linear feet, between 25 linear feet and 250 linear feet, and between 25 linear feet and 100 linear feet.

The dispenser unit may comprise a first dispenser and a second dispenser wherein the first dispenser may be fluidly connected to each of the A liquid component pump and the B liquid component pump, and the second dispenser may be fluidly connected to each of the A liquid component pump and the B liquid component pump. The fluid connection between the A liquid component pump and the first dispenser may comprise a first A liquid hose. The fluid connection between the A liquid component pump and the second dispenser may comprise a second A liquid hose. The fluid connection between the B liquid component pump and the first dispenser may comprise a first B liquid hose. The fluid connection between the B liquid component pump and the second dispenser may comprise a second B liquid hose.

The dispenser unit may comprise a mixing chamber. The dispenser unit may comprise an impingement port.

DETAILED DESCRIPTION

Figure 1:
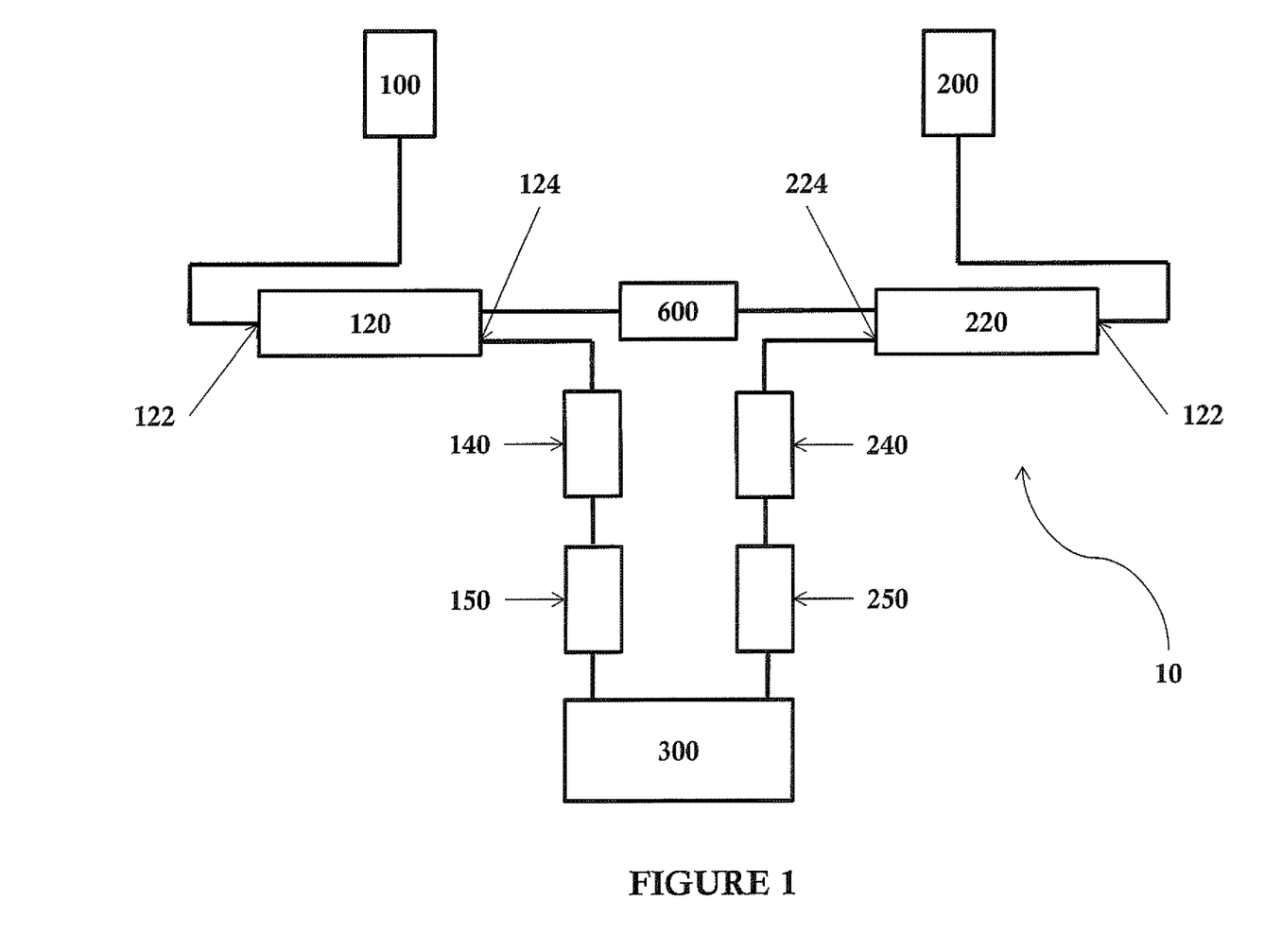
FIG. 1 is a block diagram of an apparatus for dispensing a mixture of at least two liquid components using a single motor as described herein.

Disclosed herein, and shown in the Figures, is an apparatus and method for dispensing a mixture of at least two liquid components. As shown in FIG. 1, the apparatus (10) may comprise an A liquid source (100), an A liquid pump (120), and a first motor (600). The system (10) may also comprise a B liquid source (200), and a B liquid pump (220). The system (10) may also comprise a dispenser unit (300). One example of a dispenser unit is an Air-Purge Gun, Part Number 253888 available from Graco Inc. of Minneapolis, Minn., U.S.A. Another example of a dispenser unit is a Propurge™ LP Foam Gun, Part Number 0153951 with Part Number 0153952 tip available from Titan Tool Inc. of Plymouth, Minn., U.S.A.

As shown in FIG. 1, the A liquid pump may comprise an A liquid pump inlet (122), and an A liquid pump outlet (124). The A liquid pump may be fluidly connected to the A liquid source (100). Said fluid connection may allow an A liquid to flow out of the A liquid source (100) and into the A liquid pump (100) when the A liquid pump (100) is being driven by the first motor (600).

As shown in FIG. 1, the A liquid pump (120), driven by the first motor (600) may be fluidly connected to the dispenser unit (300). Said fluid connection may allow the A liquid which has flowed out of the A liquid source (100) and into the A liquid pump (120) to flow out of the A liquid pump (120) and into the dispenser unit (300) when the A liquid pump (120) is being driven by the first motor (600).

The A liquid source (100) may be selected from the group consisting of a drum, a tote, or a tank. The A liquid source may be of any size, and may be made of a variety of materials including steel, aluminum, or plastics. The A liquid source preferably includes an opening or port into which a hose or conduit is placed with the A liquid being drawing into the A liquid pump (120) through the hose or conduit. One preferred A liquid source is a standard 55 gallon drum. The A liquid source may include an A liquid source pump for drawing the A liquid into the fluid connection between the A liquid source and the A liquid pump (120). One example of an A liquid source pump is a Stick Pump, Part Number 1 IES-akurate-stikpm available from Akurate Dynamics, LLC of Houston, Tex., U.S.A. The A liquid source may also include an A liquid source temperature regulator, which may also be known as a fourth A liquid source temperature regulator. One example of an A liquid source temperature regulator is a FLUX55 FluxWrap® 55-Gallon Drum Cooling Blanket available from Flatwork Technologies, LLC of Salt Lake City, Utah, U.S.A.

As shown in FIG. 1, there may also be a first A liquid temperature regulator (140) located between the A liquid component pump (120) and the dispenser unit (300). There may also be a second A liquid temperature regulator (150) located between the first A liquid temperature regulator (140) and the dispenser unit (300). The first A liquid temperature regulator and second A liquid temperature regulator may each independently be selected from the group consisting of a heater, a cooler (also known as a chiller), or a combination heater and cooler. One of ordinary skill will recognize that a heater is a device capable of increasing the temperature of the A liquid component via convection, conduction, and/or radiation as the A liquid component passes by or through the heater. Similarly, one of ordinary skill will recognize that a cooler (also known as a chiller) is a device capable of decreasing the temperature of the A liquid component by removal of heat through convection, conduction, and/or radiation as the A liquid component passes by or through the cooler (or chiller). Finally, one of ordinary skill will recognize that a combination heater and cooler is a device capable of alternatively increasing or decreasing the temperature of the A liquid component via convection, conduction, and/or radiation as the A liquid component passes by or through the combination heater and cooler.

The first A liquid temperature regulator (140) and the second A liquid temperature regulator (150) may each independently be selected from the group consisting of a direct temperature regulator or an indirect temperature regulator. A direct temperature regulator heats and/or cools the liquid by making direct contact with the liquid. Such direct temperature regulators are also known as in-line heaters and/or in-line coolers. An indirect temperature regulator heats and/or cools the liquid by applying heat and/or cooling to the vessel or conduit which contains the liquid. In some embodiments, the first A liquid temperature regulator (140) is an indirect temperature regulator while the second A liquid temperature regulator (150) is a direct temperature regulator. In other embodiments, the first A liquid temperature regulator (140) is a direct temperature regulator while the second A liquid temperature regulator (150) is an indirect temperature regulator. In still other embodiments, the first A liquid temperature regulator (140) is an indirect temperature regulator and the second A liquid temperature regulator (150) is also an indirect temperature regulator. In still other embodiments, the first A liquid temperature regulator (140) is a direct temperature regulator and the second A liquid temperature regulator (150) is also a direct temperature regulator. One example of a first A liquid temperature regulator is a SUREFIRE™ Heater Block, available from Titan Tool Inc. of Plymouth, Minn., U.S.A. One example of a second A liquid temperature regulator is a SUREFIRE™ Heated Hose, available from Titan Tool Inc. of Plymouth, Minn., U.S.A.

In some embodiments, not shown, the entire fluid connection between the A liquid component pump (120) and the dispenser unit (300) may be a temperature regulator. One might think of this as the first A liquid temperature regulator (140) and the second A liquid temperature regulator (150) being combined into one temperature regulator that runs the entire length of the fluid connection between the A liquid component pump (120) and the dispenser unit (300). When the entire fluid connection between the A liquid component pump (120) and the dispenser unit (300) is a temperature regulator, said temperature regulator may be an electrically traced hose (for heating) or a separate line contained inside of the fluid connection through which a coolant such as ethylene glycol or propylene glycol is passed (for heating and/or cooling).

As shown in FIG. 1, the B liquid pump (220) may comprise a B liquid pump inlet (222), and a B liquid pump outlet (224). The B liquid pump may be fluidly connected to the B liquid source (200). Said fluid connection may allow a B liquid to flow out of the B liquid source (200) and into the B liquid pump (220) when the B liquid pump (220) is being driven by the first motor (600).

The B liquid source (200) may be selected from the group consisting of a drum, a tote or a tank. The B liquid source may be of any size, and may be made of a variety of materials including steel, aluminum, or plastics. The B liquid source preferably includes an opening or port into which a hose or conduit is placed with the B liquid being drawing into the B liquid pump (220) through the hose or conduit. One preferred B liquid source is a standard 55 gallon drum. The B liquid source may include a B liquid source pump for drawing the B liquid into the fluid connection between the B liquid source and the B liquid pump (220). One example of a B liquid source pump is a Stick Pump, Part Number 1 IES-akurate-stikpm available from Akurate Dynamics, LLC of Houston, Tex., U.S.A. The B liquid source may also include an B liquid source temperature regulator, which may also be known as a fourth B liquid source temperature regulator. One example of an B liquid source temperature regulator is a FLUX55 FluxWrap® 55-Gallon Drum Cooling Blanket available from Flatwork Technologies, LLC of Salt Lake City, Utah, U.S.A.

As shown in FIG. 1, the B liquid pump (220), driven by the B liquid motor (230) may be fluidly connected to the dispenser unit (300). Said fluid connection may allow the B liquid which has flowed out of the B liquid source (200) and into the B liquid pump (220) to flow out of the B liquid pump (220) and into the dispenser unit (300) when the B liquid pump (220) is being driven by the first motor (600).

As shown in FIG. 1, there may also be a first B liquid temperature regulator (240) located between the B liquid component pump (220) and the dispenser unit (300). There may also be a second B liquid temperature regulator (250) located between the first B liquid temperature regulator (240) and the dispenser unit (300). The first B liquid temperature regulator and second B liquid temperature regulator may each independently be selected from the group consisting of a heater, a cooler (also known as a chiller), or a combination heater and cooler. One of ordinary skill will recognize that a heater is a device capable of increasing the temperature of the B liquid component via convection, conduction, and/or radiation as the B liquid component passes by or through the heater. Similarly, one of ordinary skill will recognize that a cooler (also known as a chiller) is a device capable of decreasing the temperature of the B liquid component by removal of heat through convection, conduction, and/or radiation as the B liquid component passes by or through the cooler (or chiller). Finally, one of ordinary skill will recognize that a combination heater and cooler is a device capable of alternatively increasing or decreasing the temperature of the B liquid component via convection, conduction, and/or radiation as the B liquid component passes by or through the combination heater and cooler.

The first B liquid temperature regulator (240) and the second B liquid temperature regulator (250) may each independently be selected from a direct temperature regulator or an indirect temperature regulator. A direct temperature regulator heats and/or cools the liquid by making direct contact with the liquid. Such direct temperature regulators are also known as in-line heaters and/or in-line coolers. An indirect temperature regulator heats and/or cools the liquid by applying heat and/or cooling to the vessel or conduit which contains the liquid. In some embodiments, the first B liquid temperature regulator (240) is an indirect temperature regulator while the second B liquid temperature regulator (250) is a direct temperature regulator. In other embodiments, the first B liquid temperature regulator (240) is a direct temperature regulator while the second B liquid temperature regulator (250) is an indirect temperature regulator. In still other embodiments, the first B liquid temperature regulator (240) is an indirect temperature regulator and the second B liquid temperature regulator (250) is also an indirect temperature regulator. In still other embodiments, the first B liquid temperature regulator (240) is a direct temperature regulator and the second B liquid temperature regulator (250) is also a direct temperature regulator. One example of a first B liquid temperature regulator is a SUREFIRE™ Heater Block, available from Titan Tool Inc. of Plymouth, Minn., U.S.A. One example of a second B liquid temperature regulator is a SUREFIRE™ Heated Hose, available from Titan Tool Inc. of Plymouth, Minn., U.S.A.

In some embodiments, not shown, the entire fluid connection between the B liquid component pump (220) and the dispenser unit (300) may be a temperature regulator. One might think of this as the first B liquid temperature regulator (240) and the second B liquid temperature regulator (250) being combined into one temperature regulator that runs the entire length of the fluid connection between the B liquid component pump (220) and the dispenser unit (300). A portion, if not the entire, fluid connection between the B liquid component pump (220) and the dispenser unit (300) may be a heater, with the heat provided by electric tracing of the fluid connection, for example, an electrically traced hose. Alternatively, a portion, if not the entire, fluid connection between the B liquid component pump and the dispenser unit may be a cooler, with the heat removal provided by a separate line contained inside of the fluid connection through which a coolant such as propylene glycol or ethylene glycol is passed.

Figure 2:
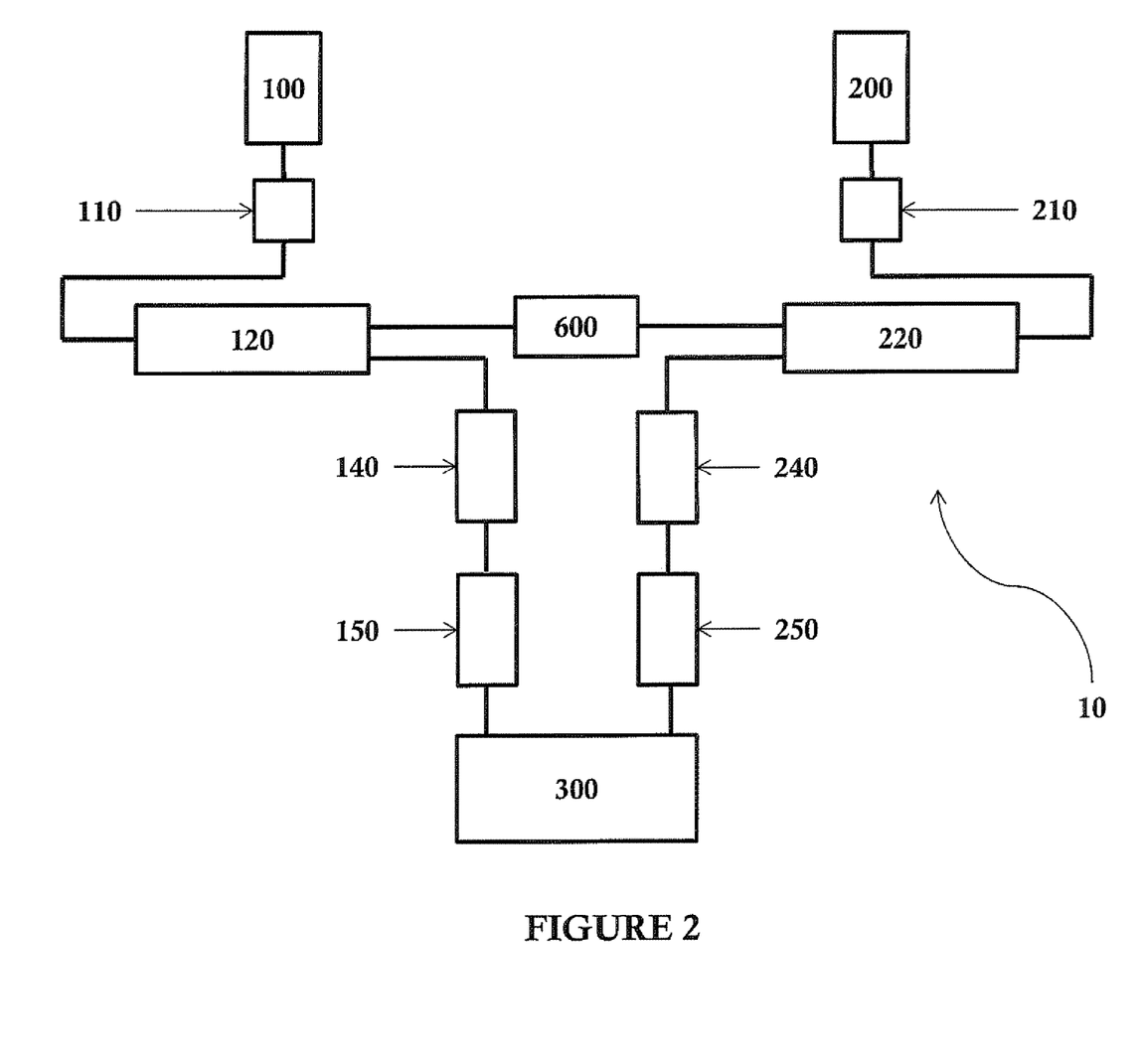
FIG. 2 is a block diagram of an apparatus for dispensing a mixture of at least two liquid components comprising a third temperature regulator as described herein.

As shown in FIG. 2, in some embodiments, there may be a third A liquid temperature regulator (110) located between the A liquid component source (100) and the A liquid component pump (120). Similarly, in some embodiments, there may be a third B liquid temperature regulator (210) located between the B liquid component source (200) and the B liquid component pump (220). The third A liquid temperature regulator (110) and the third B liquid temperature regulator (210) may each independently be selected from the group consisting of direct temperature regulators and indirect temperature regulators. A preferred third A liquid temperature regulator and/or third B liquid temperature regulator is an electrically traced hose. A preferred electrically traced hose for the third A liquid temperature regulator and/or third B liquid temperature is a Heated Supply Hose 230V, Part Number 503-RT 230V available from PURCRAFT GmbH of Rödermark, Germany.

Not only may the temperature regulators be independently selected, but they can be configured to be operated independent of any other temperature regulator. They may also be configured so that one temperature regulator (i.e.—a first temperature regulator) is controlled by another temperature regulator (i.e.—a second temperature regulator), yet the third temperature regulator is not. By breaking the integrated control scheme, it is believed that a more accurate dosing of the components can be accomplished. The temperature regulators may be controlled by a fluid temperature sensor system, which monitors the temperature of the A liquid and/or the B liquid and adjusts the heating and/or cooling in one or more of the temperature regulators. One example of a fluid temperature sensor system is RTD Fluid Temperature Sensor available from PURCRAFT GmbH of Roedermark, Germany. The fluid temperature sensor system may be located within the fluid connection between the pump (A liquid component pump and/or B liquid component pump) and the dispenser unit in close proximity to the dispenser unit. For example, the fluid temperature sensor system may be located within the fluid connection between the pump and the dispenser unit at a linear distance from the dispenser unit selected from the group consisting of no greater than 5 linear feet from the dispenser unit, no greater than 7.5 linear feet from the dispenser unit, no greater than 10 linear feet from the dispenser unit, no greater than 12.5 linear feet from the dispenser unit, and no greater than 15 linear feet from the dispenser unit.

Figure 3:
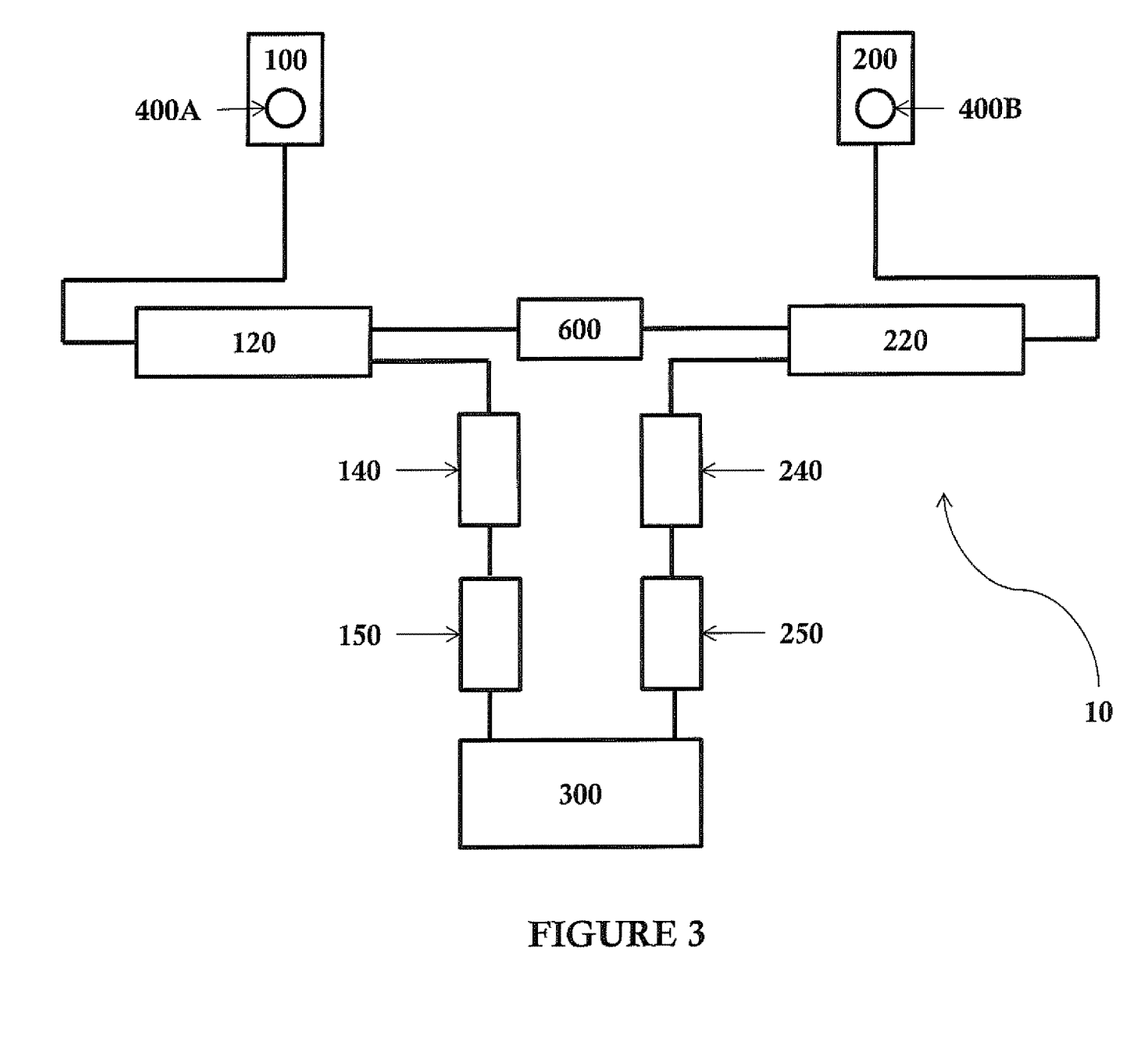
FIG. 3 is a block diagram of an apparatus for dispensing a mixture of at least two liquid components with the introduction of a solids source as described herein.

As shown in FIG. 3, the apparatus (10) may further comprise a first solids source (400A) and/or a second solids source (400B). The first solids source (400A) may be directly added to the A liquid source (100) as shown in FIG. 3. Alternatively, the first solids source (400A) may be injected into the first A liquid temperature regulator (110), the conduit or hose running between the first A liquid source (100) and the first A liquid temperature regulator (110), or the conduit or hose running between the first A liquid temperature regulator (110) and the A liquid pump (120). The second solids source (400B) may be directly added to the B liquid source (200) as shown in FIG. 3. Alternatively, the second solids source (400B) may be injected into the first B liquid temperature regulator (210), the conduit or hose running between the first B liquid source (200) and the first B liquid temperature regulator (210), or the conduit or hose running between the first B liquid temperature regulator (210) and the B liquid pump (220). When used, the first solids source may introduce a first solid additive into the A liquid either before or after the A liquid source pump (120). Similarly, when used, the second solids source may introduce a second solid additive into the B liquid either before or after the B liquid source pump (220). In some embodiments, there may be only a first solids source. In some embodiments, there may be only a second solids source. In some embodiments, there may be both a first solids source and a second solids source.

Solids which may be introduced into either the A liquid or the B liquid may be selected from the group consisting of ceramics, graphite, melamine, mineral fibers, cemantatious particles, antimonium trioxide, brominated salts, pigments, and combinations thereof.

Figure 4:
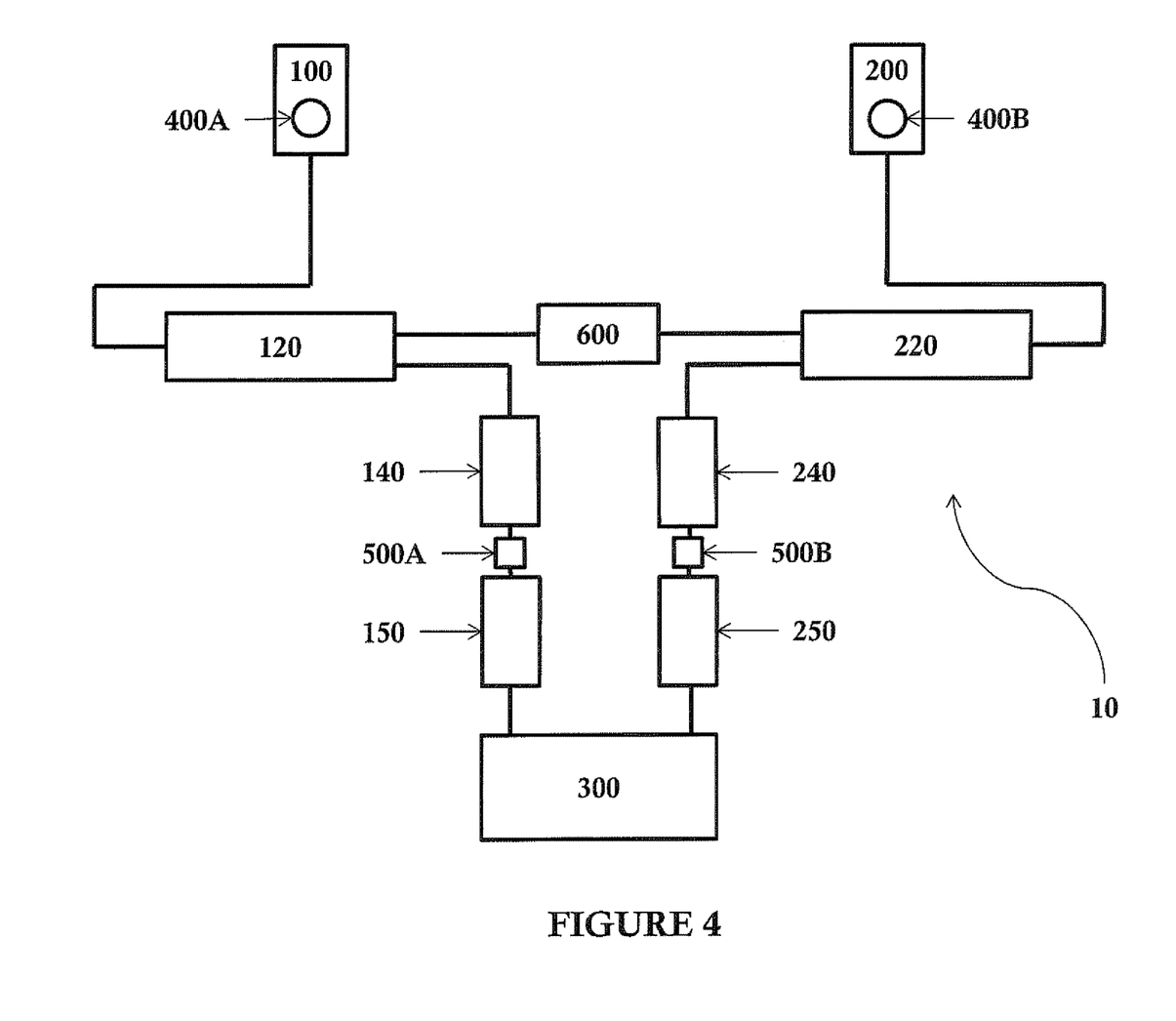
FIG. 4 is a block diagram of an apparatus for dispensing a mixture of at least two liquid components including a mixer unit as described herein.

As shown in FIG. 4, in some embodiments the apparatus (10) may further comprise a first mixer unit (500A) connected to or inside of the conduit or hose running from the A liquid component pump (120) to the dispenser unit (300), and/or a second mixer unit (500B) connected to or inside of the conduit or hose running from the B liquid component pump (220) to the dispenser unit (300). The first mixer unit (500A) may be used with or without the first solids source (400A). Similarly, the second mixer unit (500B) may be used with or without the second solids source (400B). The first mixer unit (500A), when used in conjunction with a first solids source (400A), creates a turbulent flow of the A liquid comprising the first solid additive so as to maintain the first solid additive in suspension in the A liquid. Similarly, the second mixer unit (500B), when used in conjunction with a second solids source (400B), creates a turbulent flow of the B liquid comprising the second solid additive so as to maintain the second solid additive in suspension in the B liquid. In embodiments where one or both of the entire fluid connection between the A liquid component pump (120) and the dispenser unit (300) and/or the entire fluid connection between the B liquid component pump (220) and the dispenser unit (300) is a temperature regulator, the first mixer unit (500A) and/or the second mixer unit (500B) are preferably located inside of their respective fluid connection.

The first mixer unit (500A) and the second mixer unit (500B) may each independently be selected from the group consisting of static in-line mixers, hydraulic mixers, electric mixers, air mixers, and combinations thereof.

In some embodiments, not shown, there may also be a mixer unit in the A liquid component source (100) and/or the B liquid component source (200). The mixer may be a drum mixer, a static mixer or a sonic mixer. When used, the sonic mixer preferably operates in a frequency range selected from the group consisting of between 15,000 and 35,000 kHz, between 15,000 and 32,500 kHz, between 15,000 and 30,000 kHz, between 20,000 kHz and 35,000 kHz, between 20,000 kHz and 32,500 kHz, and between 20,000 and 30,000 kHz. One example of a mixer unit (either a first mixer unit, a second mixer unit and/or a third mixer unit) is an Ultrasonic Mixer, Part Number 322026 available from Lyman Products Corp. of Middletown, Conn., U.S.A. One example of a static mixer is a Koflo® 3/8-40-3-6-2 Pipe Mixer available from Cole-Parmer Instrument Company, LLC of Vernon Hills, Ill., U.S.A. One example of a drum mixer is a DM-101 drum mixer available from International Pump Manufacturing Inc. of Sumner, Wash., U.S.A.

Figure 5:
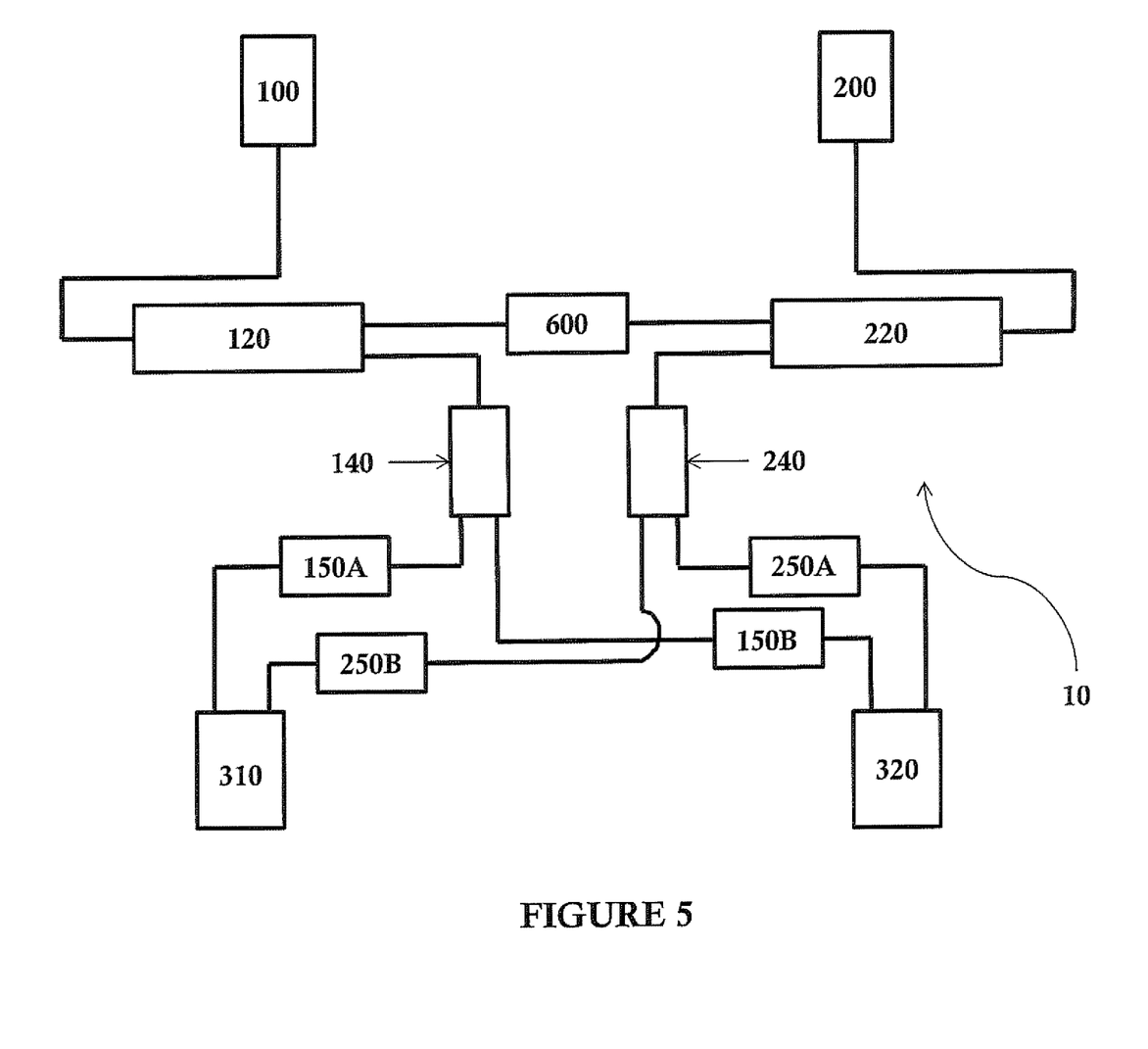
FIG. 5 is a block diagram of an apparatus for dispensing a mixture of at least two liquid components from multiple dispensers as described herein.

As shown in FIG. 5, in some embodiments, the dispenser unit (300) comprises a first dispenser (310) and a second dispenser (320). The first dispenser (310) and the second dispenser (320) allow the mixture of at least two liquid components to be dispensed from the two separate dispensers onto or into two separate surfaces simultaneously. In such embodiments, the first dispenser (310) is fluidly connected to each of the A liquid component pump (120) and the B liquid component pump (220) while the second dispenser (320) is fluidly connected to each of the A liquid component pump (120) and the B liquid component pump (220). The fluid connection between the A liquid component pump (120) and the first dispenser (310) may comprise a first A liquid hose. The fluid connection between the A liquid component pump (120) and the second dispenser (320) may comprise a second A liquid hose. The fluid connection between the B liquid component pump (220) and the first dispenser (310) may comprise a first B liquid hose. The fluid connection between the B liquid component pump (220) and the second dispenser (320) may comprise a second B liquid hose.

As shown in FIG. 5, in some embodiments where the dispenser unit (300) comprises a first dispenser (310) and a second dispenser (320), the second A liquid temperature regulator may comprise a second A liquid temperature regulator for the first dispenser (150A) and a second A liquid temperature regulator for the second dispenser (150B). Similarly, the second B liquid temperature regulator may comprise a second B liquid temperature regulator for the first dispenser (250A) and a second B liquid temperature regulator for the second dispenser (250B). It should be noted that 150A, 150B, 250A, and 250B may be any combination of direct temperature regulators and indirect temperature regulators.

The A liquid component pump (120) may comprise at least two chambers with at least three chambers being preferred. Similarly, the B liquid component pump (220) may comprise at least two chambers with at least three chambers being preferred. The A liquid component pump (120) and the B liquid component pump (220) may each have its own independently controlled linear flow. Linear flow provides for a consistent movement of the A liquid and/or the B liquid both in terms of volume velocity, and corresponding mass velocity over the period of time in which the apparatus is in use. Linear flow is differentiated from pulse flow, in which the movement of the A liquid and/or the B liquid occurs in pulses which may be inconsistent in terms of volume velocity and corresponding mass velocity, which will affect the final mixing ratios and performance of the foam in SPF applications, and can also lead to lag related clogging of the apparatus. In non-SPF applications, such as coatings, the inconsistent volume velocity and corresponding mass velocity can also present problems for the final mixing ratio, and can lead to lag related clogging. In other words, in pulse flow systems, there are moments in which the A liquid and/or the B liquid are flowing from their respective pumps at a greater volume velocity and corresponding mass velocity relative to other moments.

The A liquid component pump (120) and the B liquid component pump (220) may each independently be selected from the group consisting of diaphragm pumps, piston pumps, screw pumps, stator pumps, and positive displacement gear pumps; each of which can provide for linear flow and are well known in the art. One preferred pump, which may be either or both of the A liquid component pump and/or the B liquid component pump, is a Hydra-Cell® D04 Series Diaphragm Pump available from Wanner Engineering, Inc. of Minneapolis, Minn., U.S.A. Another pump, which may be either or both of the A liquid component pump and/or the B liquid component pump, is an AA10VSO series 31 Axial piston variable pump available from Bosch Rexroth AG of Lohr am Main, Germany.

Figure 6:
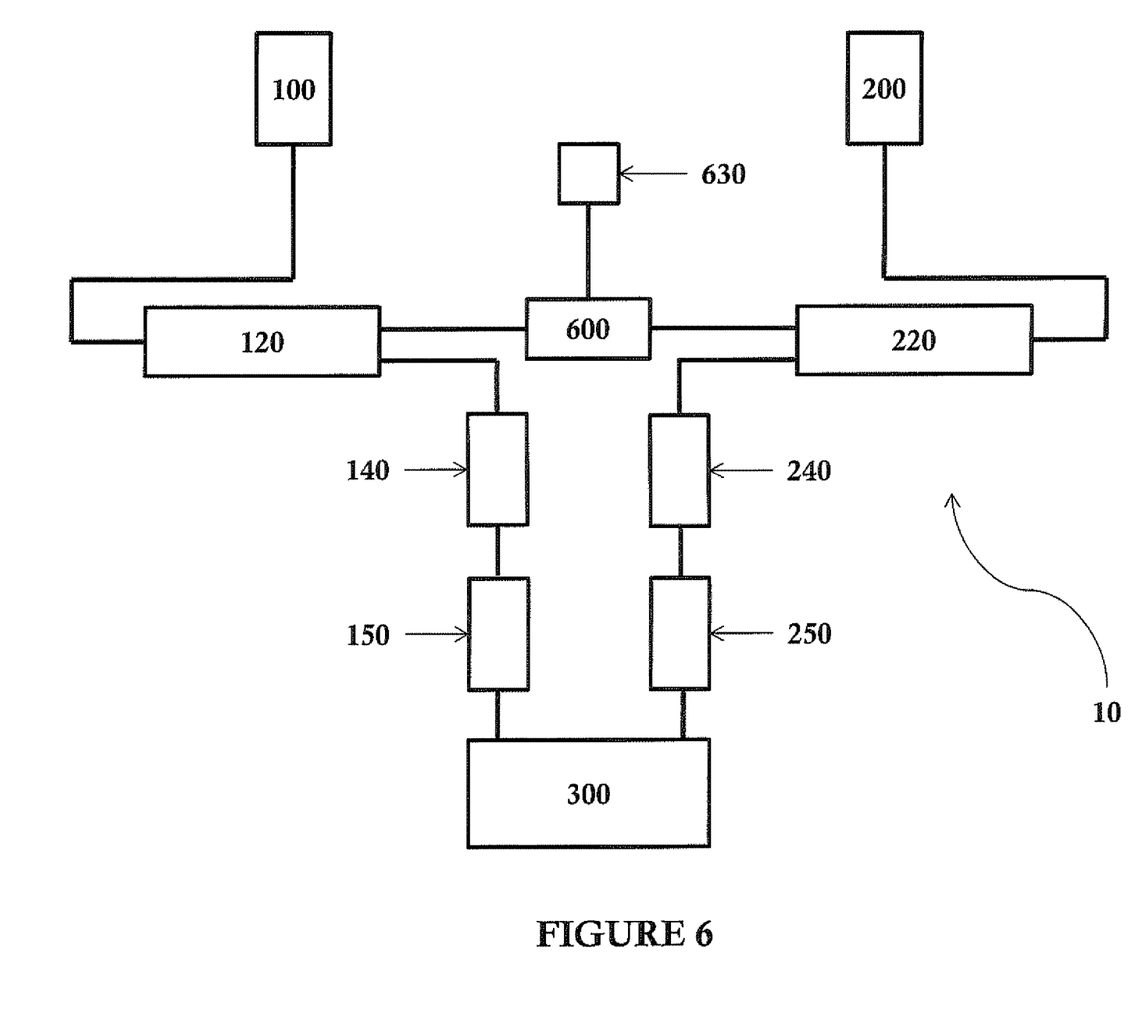
FIG. 6 is a block diagram of an apparatus for dispensing a mixture of at least two liquid components using a hydraulically driven motor as described herein.

The first motor (600) may be selected from the group consisting of hydraulic motors, air-driven motors, and electrically-driven motors. As shown in FIG. 6, when the first motor (600) is a hydraulic motor, the hydraulic motor will comprise a hydraulic drive (630) fluidly connected to the hydraulic motor (600) for sending hydraulic fluid to the hydraulic motor (600). One example of a hydraulic drive is an MRB 80 C/C (Dual SHAFT) available from M+S Hydraulic Power Transmission GmbH of Langen, Germany.

Figure 7:
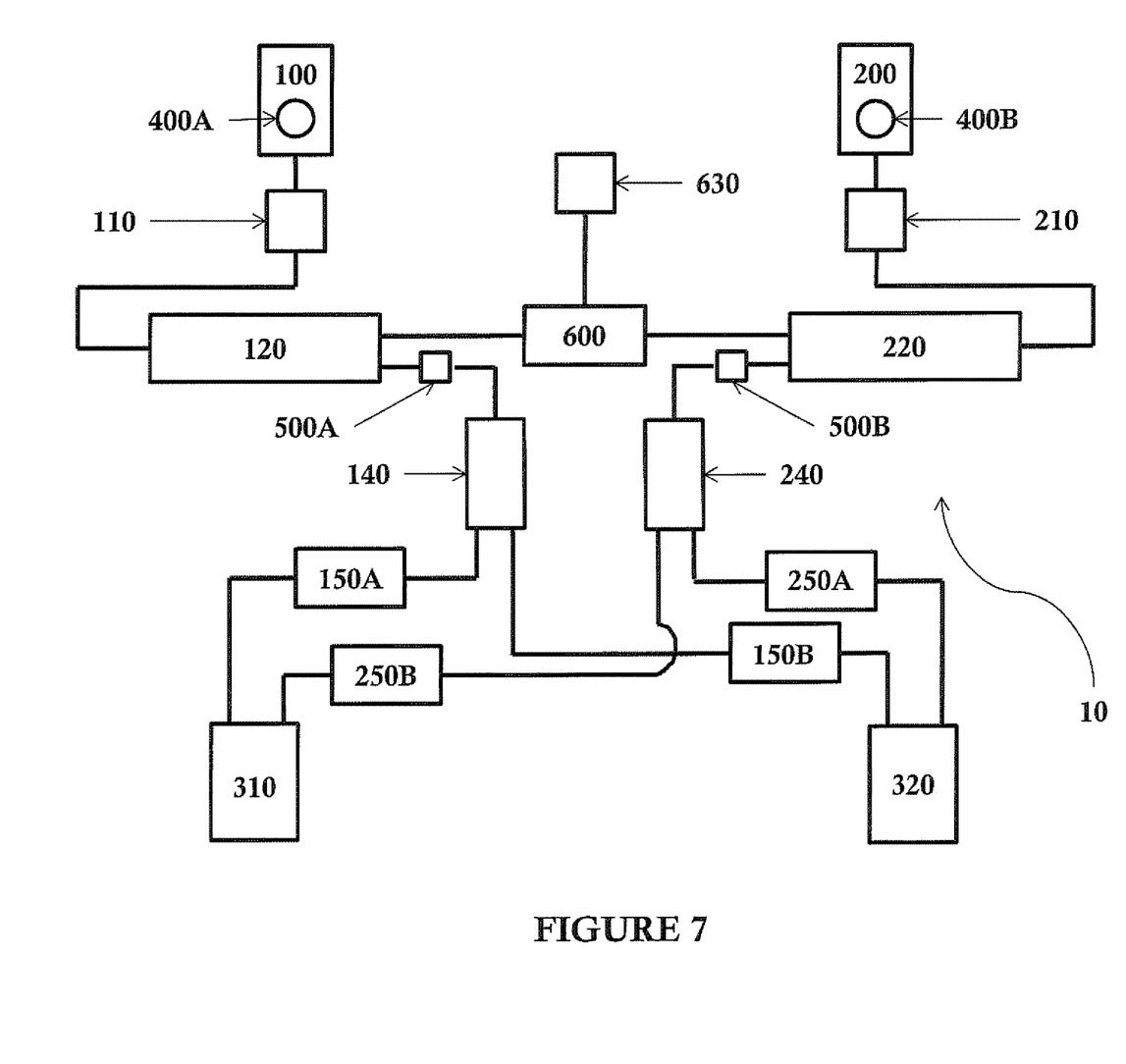
FIG. 7 is a block diagram of an apparatus for dispensing a mixture of at least two liquid components using a hydraulically driven motor, from multiple dispensers comprising a third temperature regulator and a mixer unit with the introduction of a solids source as described herein.

FIG. 7 shows one embodiment comprising solids sources (a first solids source (400A), and a second solids source (400B)), a third A liquid temperature regulator (110), a third B liquid temperature regulator (210), a hydraulic drive (630) fluidly connected to the hydraulic motor (600) for sending hydraulic fluid to the hydraulic motor (600), a first mixer unit (500A), a second mixer unit (500B), and multiple dispensers (a first dispenser (310) and a second dispenser (320)). It will be understood by one of ordinary skill in the art that these components may be used in any combination. As one example, it is not considered necessary to have multiple dispensers (a first dispenser (310) and a second dispenser (320)) when including solids sources (a first solids source (400A) and a second solids source (400B)).

In order to improve the flow and mixing characteristics, it is preferred to maintain a pressure on the A liquid and the B liquid as they move from their respective pumps to the dispenser unit. Uncontrolled or sporadic pressure drops can result in an undesired flow rate, and therefore undesired mixing, of the two components. The pressure characteristics in the fluid connection can be represented as a maximum pressure drop over the length of the conduit or hose between the pump and the dispenser unit. In preferred embodiments, the fluid connection between the A liquid component pump and the dispenser unit, and the fluid connection between the B liquid component pump and the dispenser unit are each selected so as to have a pressure drop of less than 100 psig per 600 linear feet with a pressure drop of less than 100 psig per 500 linear feet being more preferred, a pressure drop of less than 100 psig per 350 linear feet being still more preferred, and a pressure drop of less than 100 psig per 200 linear feet being even more preferred. The pressure drop can also be expressed in terms of ranges both of pressure and linear feet. For instance, the pressure drop may be selected from the group consisting of between 1 psig and 200 psig, between 1 psig and 150 psig, between 1 psig and 100 psig, between 1 psig and 50 psig, and between 1 psig and 25 psig per an amount of linear feet selected from the group consisting of between 25 linear feet and 800 linear feet, between 25 linear feet and 600 linear feet, between 25 linear feet and 500 linear feet, between 25 linear feet and 400 linear feet, between 25 linear feet and 250 linear feet, and between 25 linear feet and 100 linear feet.

In some embodiments, the apparatus may include one or more flow meters for monitoring the flow rate of the A liquid component and/or the B liquid component through the apparatus. When used the flow meter(s) may be located in one or more of the fluid connection between the A liquid component source and the A liquid component pump, the fluid connection between the B liquid component source and the B liquid component pump, the fluid connection between the A liquid component pump and the dispenser unit, the fluid connection between the B liquid component pump and the dispenser unit, and combinations thereof.

The dispenser unit may comprise a mixing chamber. For applications that require the two liquid components to mix and/or react, the two liquid components may be mixed in the mixing chamber. In such embodiments, it is preferred that the mixing occur as close as possible to a discharge port in the dispenser unit so as to prevent premature mixing of the two liquid components which can lead to clogs or other damage to the apparatus. In applications where the dispenser unit comprises two dispensers (a first dispenser (310) and a second dispenser (320) as shown in FIG. 5) each dispenser may comprise a mixing chamber. In such an embodiment, it is preferred that each dispenser's mixing chamber occur as close as possible to the respective dispenser's discharge port.

The discharge port may also be known as an impingement port. The discharge port or impingement port is the end of the dispenser through which the liquid components (in mixed or separate form) flow to be deposited onto or into a surface. In some embodiments, the dispenser may comprise multiple discharge ports or impingement ports. Each discharge port or impingement port may comprise a hole having a variety of shapes (i.e. a circular impingement port, an ovular impingement port, a hexagonal impingement port, or a square impingement port). The size of the hole(s) may be used to control the flow volume and flow velocity of the liquid components. By increasing the size of the hole(s), the flow volume out of the impingement port will be increased, but the flow velocity will be decreased due to a decrease in pressure. Alternatively, by decreasing the size of the hole(s), the flow volume out of the impingement port will be decreased, but the flow velocity will be increased due to an increase in pressure.

In some embodiments, one or more of the various components will be connected by a hose or conduit attached to a manifold. For example, there may be a manifold connected to the A liquid component pump inlet with the fluid connection between the A liquid component source and the A liquid component pump being a hose connected to the manifold on one end and the A liquid component on the opposite end. Similarly, there may be a manifold connected to the B liquid component pump inlet with the fluid connection between the B liquid component source and the B liquid component pump being a hose connected to the manifold on one end and the B liquid component on the opposite end. There may also be a manifold connected to the A liquid component pump outlet with the fluid connection between the A liquid component pump and the dispenser unit being a hose connected to the manifold on one end and the A liquid component on the opposite end. Similarly, there may also be a manifold connected to the B liquid component pump outlet with the fluid connection between the B liquid component pump and the dispenser unit being a hose connected to the manifold on one end and the B liquid component on the opposite end. The A liquid component source, the B liquid component source, and the dispenser unit may also comprise a manifold.

It is preferred that the first A liquid temperature regulator heats the A liquid to an A liquid first temperature while the B liquid temperature regulator heats the B liquid to a B liquid first temperature. The A liquid will have an A liquid first viscosity at the A liquid first temperature. Similarly, the B liquid will have a B liquid first viscosity at the B liquid first temperature. In preferred embodiments, the A liquid first viscosity will be less than 400 centipoise above or below the B liquid first viscosity with less than 200 centipoise above or below the B liquid first viscosity being more preferred, less than 100 centipoise above or below the B liquid first viscosity being still more preferred, and less than 50 centipoise above or below the B liquid first viscosity being even more preferred. In a most preferred embodiment, the A liquid first viscosity is identical to the B liquid first viscosity. The A liquid first temperature and the B liquid first temperature may each independently be selected from a range in the group consisting of between 20° C. and 65° C., between 20° C. and 60° C., between 20° C. and 55° C., between 20° C. and 50° C., between 20° C. and 45° C., between 20° C. and 40° C., between 25° C. and 65° C., between 30° C. and 65° C., between 35° C. and 65° C., and between 40° C. and 65° C.

In some embodiments, the second A liquid temperature regulator heats the A liquid to an A liquid second temperature while the B liquid temperature regulator heats the B liquid to a B liquid second temperature. The A liquid will have an A liquid second viscosity at the A liquid second temperature. Similarly, the B liquid will have a B liquid second viscosity at the B liquid second temperature. In some embodiments, in particular those in which the apparatus comprises a first solids source and/or a second solids source, it may be desirable to have the A liquid second viscosity be higher than the A liquid first viscosity and/or B liquid second viscosity be higher than the B liquid first viscosity. Raising the viscosity is thought to create a more turbulent flow in the fluid connection between the pump and the dispenser unit, which may help to keep any solids added to the system in suspension. The A liquid second temperature and the B liquid second temperature may each independently be selected from a range in the group consisting of between 20° C. and 65° C., between 20° C. and 60° C., between 20° C. and 55° C., between 20° C. and 50° C., between 20° C. and 45° C., between 20° C. and 40° C., between 25° C. and 65° C., between 30° C. and 65° C., between 35° C. and 65° C., and between 40° C. and 65° C.

Figure 8:
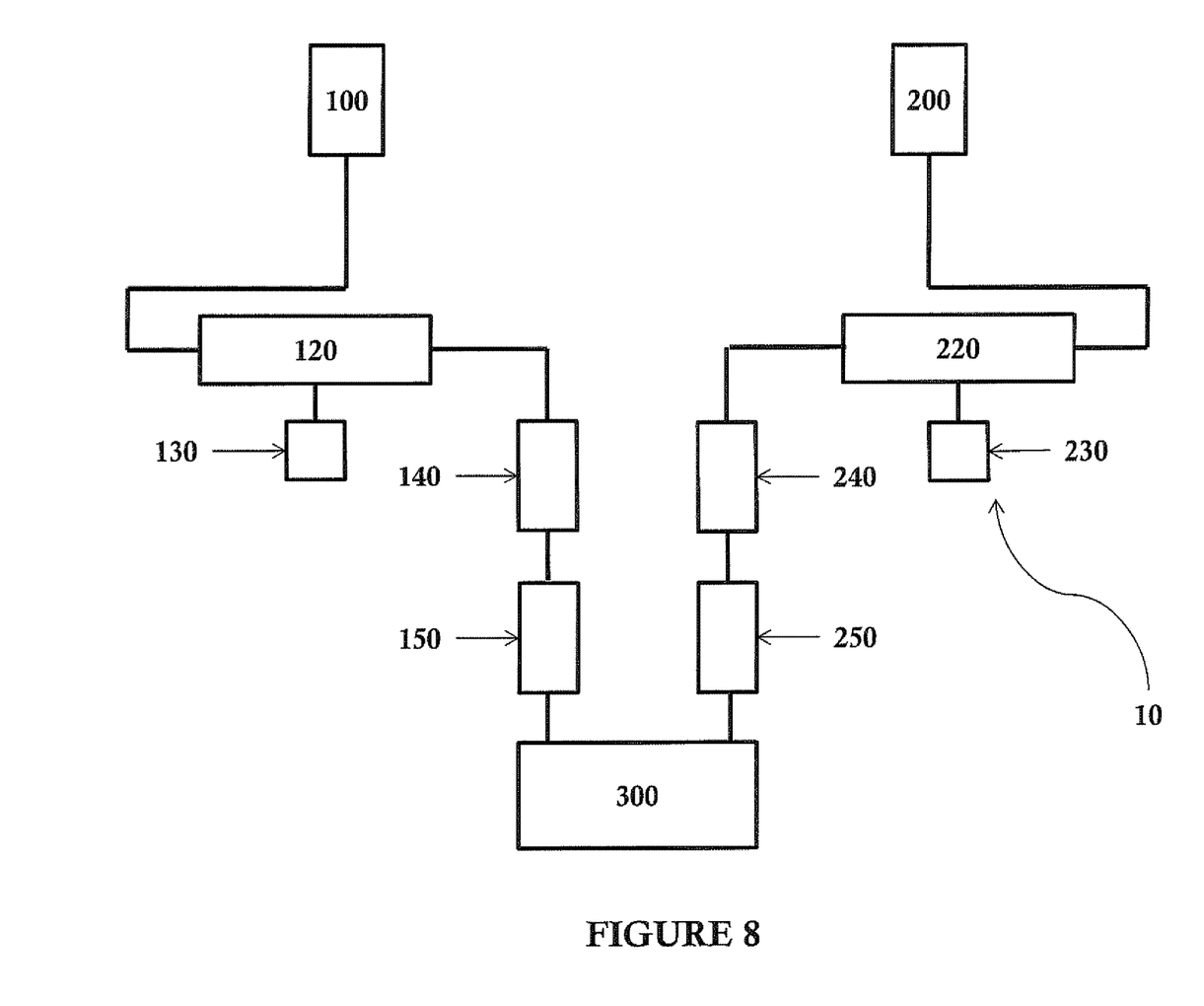
FIG. 8 is a block diagram of an apparatus for dispensing a mixture of at least two liquid components wherein each liquid component is passed through a separate pump driven by a separate motor as described herein.
Figure 9:
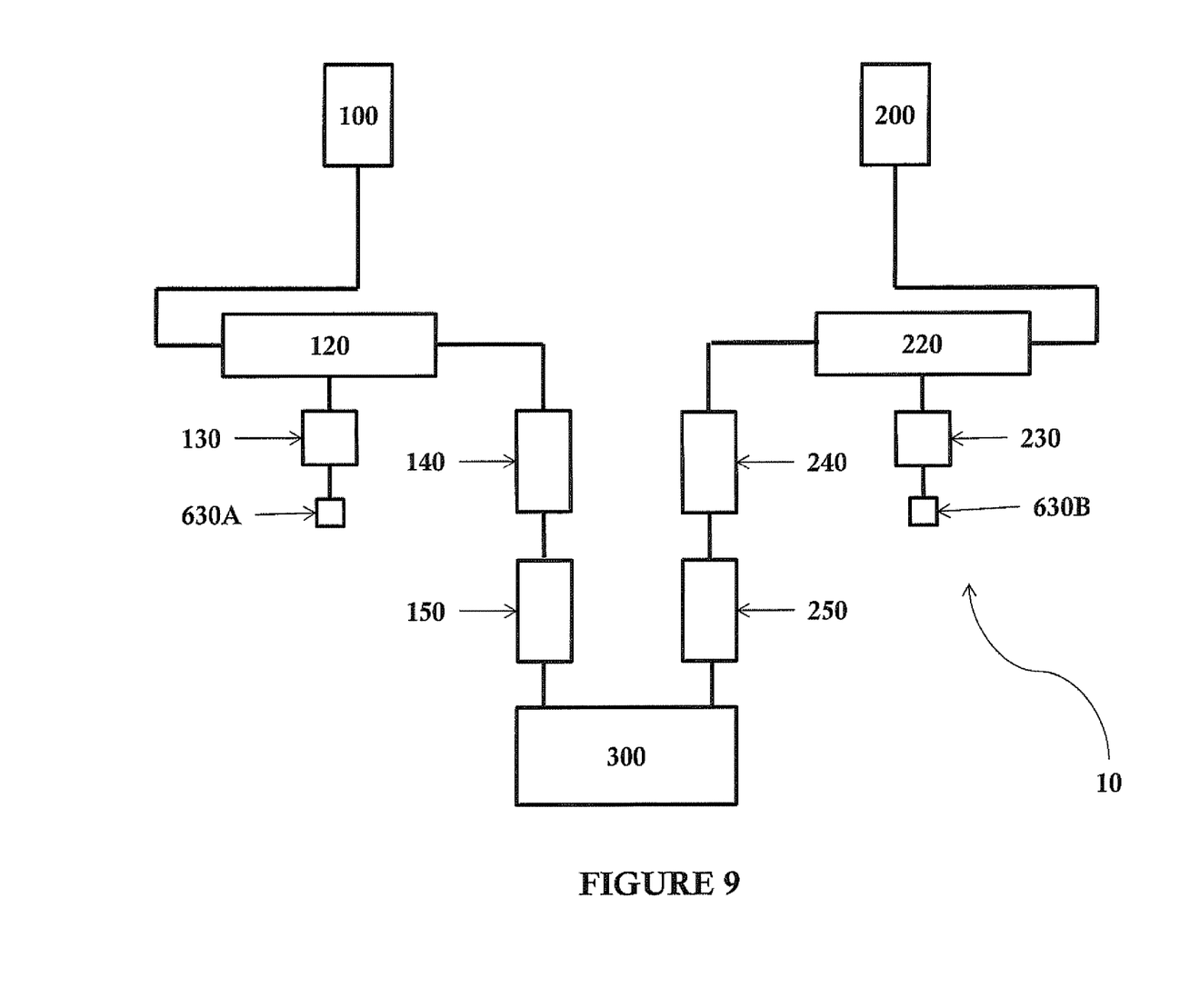
FIG. 9 is a block diagram of an apparatus for dispensing a mixture of at least two liquid components wherein each liquid component is passed through a separate hydraulically driven motor as described herein.

As shown in FIG. 8, in some embodiments, instead of a first motor (600 as shown in FIG. 1), each liquid component pump is driven by its own separate motor. As shown in FIG. 8, the A liquid component pump (120) may be driven by an A liquid component motor (130) while the B liquid component pump (220) may be driven by a B liquid component motor (230). The A liquid component motor (130) and the B liquid component motor (230) may each independently be selected from the group consisting of hydraulic motors, air-driven motors, and electrically-driven motors. As shown in FIG. 9, when the A liquid component motor (130) is a hydraulic motor, the hydraulic motor will comprise an A liquid component hydraulic drive (630A) fluidly connected to the A liquid component motor (130) for sending hydraulic fluid to the A liquid component motor (130). Similarly, when the B liquid component motor (230) is a hydraulic motor, the hydraulic motor will comprise a B liquid component hydraulic drive (630B) fluidly connected to the B liquid component motor (230) for sending hydraulic fluid to the B liquid component motor (230). One example of a hydraulic drive is an MRB 80 C/C (Dual SHAFT) available from M+S Hydraulic Power Transmission GmbH of Langen, Germany.

What is claimed is:

1. An apparatus for dispensing a mixture of at least two liquid components said apparatus comprising:

- an A liquid component source which is fluidly connected with an A liquid component pump driven by a first motor, said A liquid component pump having an A liquid component pump inlet and an A liquid component pump outlet which is fluidly connected with;
- a dispenser unit;
- a B liquid component source which is fluidly connected with a B liquid component pump driven by the first motor, said B liquid component pump having a B liquid component pump inlet and a B liquid component pump outlet which is fluidly connected to the dispenser unit; and
- a first solids source; and wherein the A liquid component pump comprises at least two chambers, the B liquid component pump comprises at least two chambers, there is a first A liquid temperature regulator located between the A liquid component pump and the dispenser unit, a second A liquid temperature regulator located between the first A liquid component temperature regulator and the dispenser unit, a first B liquid temperature regulator located between the B liquid component pump and the dispenser unit, a second B liquid temperature regulator located between the first B liquid component temperature regulator and the dispenser unit, and wherein the apparatus is configured to maintain first solids from the first solids source in suspension in an A liquid from the A liquid component source throughout the apparatus.

2. The apparatus of claim 1, further comprising a third A liquid component temperature regulator located between the A liquid component source and the A liquid component pump, and a third B liquid component temperature regulator located between the B liquid component source and the B liquid component pump.

3. The apparatus of claim 2, wherein the third A liquid temperature regulator and the third B liquid temperature regulator are each independently selected from the group consisting of a direct temperature regulator and an indirect temperature regulator.

4. The apparatus of claim 1, wherein the first solids source is added directly to the A liquid component source.

5. The apparatus of claim 1, wherein the first solids source is injected into one or both of the first A liquid temperature regulator and the fluid connection between the A liquid component source and the A liquid component pump.

6. The apparatus of claim 1, further comprising a first mixer unit.

7. The apparatus of claim 6, wherein the first mixer unit is connected to or inside of the fluid connection between the A liquid component pump and the dispenser unit.

8. The apparatus of claim 1, further comprising a second solids source.

9. The apparatus of claim 8, wherein the second solids source is added directly to the B liquid component source.

10. The apparatus of claim 8, wherein the second solids source is injected into one or both of the first B liquid temperature regulator and the fluid connection between the B liquid component source and the B liquid component pump.

11. The apparatus of claim 8, further comprising a second mixer unit.

12. The apparatus of claim 1, wherein the A liquid component pump has a linear flow.

13. The apparatus of claim 1, wherein the B liquid component pump has a linear flow.

14. The apparatus of claim 1, wherein the A liquid component pump and the B liquid component pump are each independently selected from the group consisting of diaphragm pumps, piston pumps, and positive displacement gear pumps.

15. The apparatus of claim 1, wherein the first motor is selected from the group consisting of hydraulic motors, air-driven motors, and electrically-driven motors.

16. The apparatus of claim 1, wherein the A liquid component pump is driven by an A liquid component motor and the B liquid component pump is driven by a B liquid component motor.

17. The apparatus of claim 16, wherein the A liquid component motor and the B liquid component motor are each independently selected from the group consisting of hydraulic motors, air-driven motors, and electrically-driven motors.

18. The apparatus of claim 1, wherein the fluid connection between the A liquid component pump and the dispenser unit, and the fluid connection between the B liquid component pump and the dispenser unit are each selected so as to have a pressure drop represented in terms of a decrease of psig per an amount of linear feet wherein the decrease of psig is selected from the group consisting of between 1 psig and 200 psig, between 1 psig and 150 psig, between 1 psig and 100 psig, between 1 psig and 50 psig, and between 1 psig and 25 psig; and the amount of linear feet is selected from the group consisting of between 25 linear feet and 800 linear feet, between 25 linear feet and 600 linear feet, between 25 linear feet and 500 linear feet, between 25 linear feet and 400 linear feet, between 25 linear feet and 250 linear feet, and between 25 linear feet and 100 linear feet.

19. The apparatus of claim 1, wherein the dispenser unit comprises an impingement port.

* * * * *